United States Patent
Ogahara et al.

(10) Patent No.: US 9,593,291 B2
(45) Date of Patent: Mar. 14, 2017

(54) LUBRICATING OIL COMPOSITION, AND SLIDING MECHANISM USING LUBRICATING OIL COMPOSITION

(71) Applicant: IDEMITSU KOSAN CO., LTD., Chiyoda-ku (JP)

(72) Inventors: Yoko Ogahara, Sodegaura (JP); Moritsugu Kasai, Ichihara (JP); Hiroaki Koshima, Sodegaura (JP); Masanori Tsujioka, Kyoto (JP); Koji Miyake, Kyoto (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/384,324

(22) PCT Filed: Mar. 18, 2013

(86) PCT No.: PCT/JP2013/057750
§ 371 (c)(1),
(2) Date: Sep. 10, 2014

(87) PCT Pub. No.: WO2013/137478
PCT Pub. Date: Sep. 19, 2013

(65) Prior Publication Data
US 2015/0036962 A1    Feb. 5, 2015

(30) Foreign Application Priority Data
Mar. 16, 2012 (JP) .................... 2012-060605

(51) Int. Cl.
*C10M 141/00* (2006.01)
*C10M 141/10* (2006.01)
(Continued)

(52) U.S. Cl.
CPC ........ *C10M 141/10* (2013.01); *C10M 141/00* (2013.01); *C10M 163/00* (2013.01);
(Continued)

(58) Field of Classification Search
CPC ...... C10M 2207/262; C10M 2207/289; C10M 2209/084; C10M 2215/08;
(Continued)

(56) References Cited

U.S. PATENT DOCUMENTS 5,851,962 A * 12/1998 Kaga .................. C10M 141/02
508/162
7,563,752 B2 * 7/2009 Yagishita ............ C10M 141/10
508/371
(Continued)

FOREIGN PATENT DOCUMENTS

| EP | 0 768 366 | 4/1997 |
| EP | 1 418 353 A2 | 5/2004 |

(Continued)

OTHER PUBLICATIONS

U.S. Appl. No. 14/383,403, filed Sep. 5, 2014, Koshima, et al.
(Continued)

*Primary Examiner* — Taiwo Oladapo
(74) *Attorney, Agent, or Firm* — Oblon, McClelland, Maier & Neustadt, L.L.P.

(57) ABSTRACT

Disclosed is a lubricating oil composition for low-friction sliding materials, which is used in a sliding mechanism where a DLC film containing hydrogen in an amount of from 5 atom % to 50 atom % is formed on at least one sliding surface.
The lubricating oil composition contains, in the lubricant base oil therein and based on the total amount of the composition, (A) an organic zinc dithiophosphate in an amount of from 0.005% by mass to 0.12% by mass in terms of the phosphorus concentration therein, (B) an amide-based
(Continued)

friction-reducing agent in an amount of from 0.05% by mass to 5.0% by mass, and (C) an alkaline earth metal salicylate-based detergent and/or an alkaline earth metal sulfonate-based detergent in an amount of from 0.05% by mass to 0.5% by mass in terms of the alkaline earth metal concentration therein.

7 Claims, 5 Drawing Sheets

(51) Int. Cl.
 *C10M 163/00* (2006.01)
 *F16C 33/04* (2006.01)
(52) U.S. Cl.
 CPC ..... *F16C 33/043* (2013.01); *C10M 2207/262* (2013.01); *C10M 2207/289* (2013.01); *C10M 2209/084* (2013.01); *C10M 2215/08* (2013.01); *C10M 2215/082* (2013.01); *C10M 2215/28* (2013.01); *C10M 2219/044* (2013.01); *C10M 2219/046* (2013.01); *C10M 2219/068* (2013.01); *C10M 2223/045* (2013.01); *C10N 2240/10* (2013.01); *C10N 2280/00* (2013.01); *F16C 2206/04* (2013.01)
(58) Field of Classification Search
 CPC ........ C10M 2215/082; C10M 2215/28; C10M 2219/044; C10M 2219/046; C10M 2219/068; C10M 2223/045; C10M 163/00; C10M 141/10; C10N 2240/10; C10N 2280/00; F16C 2206/00; F16C 33/043
 See application file for complete search history.

(56) References Cited

U.S. PATENT DOCUMENTS

| 2004/0092405 | A1 | 5/2004 | Konishi et al. |
| 2005/0130854 | A1 | 6/2005 | Yagishita |
| 2005/0213854 | A1 | 9/2005 | Konishi et al. |
| 2008/0167206 | A1 | 7/2008 | Konishi et al. |
| 2008/0234153 | A1 | 9/2008 | Matsui |
| 2011/0028361 | A1 | 2/2011 | Konishi et al. |
| 2012/0172266 | A1 | 7/2012 | Kasai et al. |

FOREIGN PATENT DOCUMENTS

| EP | 1 526 170 A1 | 4/2005 |
| EP | 2 077 317 A1 | 7/2009 |
| EP | 2 080 798 A1 | 7/2009 |
| JP | 9-104888 | 4/1997 |
| JP | 2003 238982 | 8/2003 |
| JP | 2004 67812 | 3/2004 |
| JP | 2004 155891 | 6/2004 |
| JP | 2005 60416 | 3/2005 |
| JP | 2005 98495 | 4/2005 |
| JP | 2006 36850 | 2/2006 |
| JP | 2008 231189 | 10/2008 |
| JP | 2008 231191 | 10/2008 |
| JP | 2008 231192 | 10/2008 |
| JP | 2011 63654 | 3/2011 |
| JP | 2011 252073 | 12/2011 |
| JP | 2011252073 A * | 12/2011 |
| WO | WO 2011/152470 A1 | 12/2011 |

OTHER PUBLICATIONS

International Search Report Issued Jun. 25, 2013 in PCT/JP13/057750 Filed Mar. 18, 2013.
Extended European Search Report issued Nov. 10, 2015 in Patent Application No. 13760515.0.
Combined Office Action and Search Report issued Nov. 17, 2015 in Chinese Patent Application No. 201380014613.4 (with English Translation of Category of Cited Documents).
Office Action issued Aug. 23, 2016 in Japanese Patent Application No. 2013-043029.

* cited by examiner

LUBRICATING OIL COMPOSITION, AND SLIDING MECHANISM USING LUBRICATING OIL COMPOSITION

CROSS REFERENCE TO RELATED APPLICATIONS

The present application is a 35 U.S.C. §371 national stage patent application of International patent application PCT/JP2013/057750, filed on Mar. 18, 2013, published as WO/2013/137478 on Sep. 19, 2013, the text of which is incorporated by reference, and claims the benefit of the filing date of Japanese application no. 2012-060605, filed on Mar. 16, 2012, the text of which is also incorporated by reference.

TECHNICAL FIELD

The present invention relates to a lubricating oil composition and a sliding mechanism using the lubricating oil composition, and more precisely relates to a lubricating oil composition that exhibits an extremely low friction coefficient when used as a lubricating oil for low-friction sliding materials, and to a sliding mechanism that uses the lubricating oil composition and exhibits a low friction coefficient.

BACKGROUND ART

In recent years, it is important to cope with environmental problems in various fields. Technical development on energy saving and reduction of a discharge amount of carbon dioxide is thus being promoted. For example, it is an important subject to improve the fuel efficiency for vehicles, and for attaining the subject, technological development of lubricating oils and sliding materials is carried out.

As regards development of lubricating oil compositions, various base oils and additives have so far been developed for the purpose of improving various performances. As performances required to engine oils, there may be mentioned, for example, appropriate viscosity characteristics, oxidation stability, detergent dispersibility, abrasion resistance and antifoaming property. These performances are attempted to be improved by combination of various base oils and additives. In particular, zinc dialkyldithiophosphate (ZnDTP) is excellent as an abrasion resistant additive and, therefore, is often used as an additive for engine oils.

As regards development of sliding materials, on the other hand, materials having a hard film such as a TiN film or a CrN film which contributes to an improvement in an abrasion resistance are known as materials for use in parts which are exposed to severe frictional and abrasive environments (for example, a sliding part of an engine). Further, it is known that a friction coefficient can be reduced in the air in the absence of a lubricating oil by utilizing a diamond-like carbon (DLC) film. Thus, a material having a DLC film (hereinafter referred to as a DLC material) is expected as a low-friction sliding material.

However, the friction reducing effect of a DLC material is occasionally small in the presence of a lubricating oil composition, and, in this case, a fuel consumption saving effect is less liable to be obtained. Accordingly, development of a lubricating oil composition for low-friction sliding materials such as DLC materials or the like has heretofore been carried out.

For example, a lubricating oil composition for a low-friction sliding member which contains an ether-based ashless friction reducing agent is disclosed in PTL 1. Disclosed in PTL 2 and 3 are techniques in which lubricating oil compositions containing fatty acid ester-based ashless friction controlling agents and aliphatic amine-based ashless friction controlling agents are used for a sliding face between a DLC member and an iron base member and a sliding face between a DLC member and an aluminum alloy member. Disclosed in PTL 4 is a technique in which a low-friction agent composition containing an oxygen-containing organic compound and an aliphatic amine-based compound is used in a low-friction sliding mechanism having a DLC coating sliding member.

As in the above, lubricating oil compositions for low-friction sliding materials have been developed; however, even though these techniques are applied, the friction coefficient may increase when ZnDTP is incorporated for further improving abrasion resistance, and there is recognized a phenomenon that could not attain friction reduction.

Accordingly, even such a lubricating oil composition that contains, for example, ZnDTP for maintaining and improving various performances required for lubricating oil compositions, there is still required a lubricating oil composition that shows an extremely low friction coefficient when used as a lubricating oil for low-friction sliding materials.

There is also desired a sliding mechanism excellent in low-friction performance, which uses a lubricating oil composition capable of exhibiting excellent low-friction performance while maintaining various characteristics as such lubricating oil compositions, as combined with a sliding member that uses the above-mentioned DLC film on the sliding surface thereof.

CITATION LIST

Patent Literature

PTL 1: Japanese Patent Application Publication No. JP2006-036850A
PTL 2: Japanese Patent Application Publication No. JP2003-238982A
PTL 3: Japanese Patent Application Publication No. JP2004-155891A
PTL 4: Japanese Patent Application Publication No. JP2005-098495A

SUMMARY OF INVENTION

Technical Problem

The present invention has been made in consideration of the above-mentioned situation, and its object is to provide a lubricating oil composition which, even though containing a zinc dialkyldithiophosphate, can still exhibit an extremely low friction coefficient when used as a lubricating oil composition for low-friction sliding materials. Another object is to provide a sliding mechanism which, even though using a lubricating oil composition containing ZnDTP, is still excellent in low-friction performance when combined with a sliding member having a film of a specific low-friction sliding material on the sliding surface thereof.

Solution to Problem

The present inventors have assiduously studied and, as a result, have found that the above-mentioned problems can be solved by a lubricating oil composition incorporated with a specific additive. The present inventors have further found that the above-mentioned problems can be solved by constructing a sliding mechanism from the lubricating oil composition and a sliding member having, as formed thereon, a film of a specific low-friction sliding material. The present invention has been completed based on the above findings.

Thus, the present invention provides:
1. A lubricating oil composition for use for low-friction sliding materials, which contains, in the lubricant base oil therein and based on the total amount of the composition, (A) an organic zinc dithiophosphate in an amount of from 0.005% by mass to 0.12% by mass in terms of the phosphorus concentration therein, (B) an amide-based friction-reducing agent in an amount of from 0.05% by mass to 5.0% by mass, and (C) an alkaline earth metal salicylate-based detergent and/or an alkaline earth metal sulfonate-based detergent in an amount of from 0.05% by mass to 0.5% by mass in terms of the alkaline earth metal concentration therein;
2. The lubricating oil composition according to the above 1, wherein the amide-based friction-reducing agent of the component (B) is a diethanolamide having an aliphatic hydrocarbon group with from 12 to 24 carbon atoms;
3. The lubricating oil composition according to the above 1 or 2, wherein the component (A) contains, as based on the total amount of the composition, a primary zinc dialkyldithiophosphate in an amount of from 0.005% by mass to 0.05% by mass in terms of the phosphorus concentration therein;
4. The lubricating oil composition according to any of the above 1 to 3, wherein the low-friction sliding material is a material having a diamond-like carbon (DLC) film;
5. A sliding mechanism having, as sandwiched between the sliding surfaces of two sliding members that slide to each other, a lubricating oil composition of any of the above 1 to 4, wherein a DLC film containing hydrogen in an amount of from 5 atom % to 50 atom % is formed on at least one sliding surface of the two sliding members;
6. The sliding mechanism according to the above 5, wherein the DLC film is a DLC film having graphite crystal peaks in the X-ray scattering spectrum thereof;
7. The sliding mechanism according to the above 6, wherein the crystal diameter of the graphite crystal in the DLC film is from 15 nm to 100 nm;
8. The sliding mechanism according to any of the above 5 to 7, wherein the DLC film is one formed in a high-density plasma atmosphere according to a cathode PIG plasma CVD method.

Advantageous Effects of Invention

According to the present invention, there is provided a lubricating oil composition which, even though the lubricating oil therein contains a zinc dialkyldithiophosphate, can still exhibit an extremely low friction coefficient when used as a lubricating oil composition for low-friction sliding materials. The present invention also provides a sliding mechanism which, even though using a lubricating oil composition containing a zinc dialkyldithiophosphate, is still excellent in low-friction performance when combined with a sliding member having a film of a specific low-friction sliding material on the sliding surface thereof.

DESCRIPTION OF EMBODIMENTS

Figure 1:
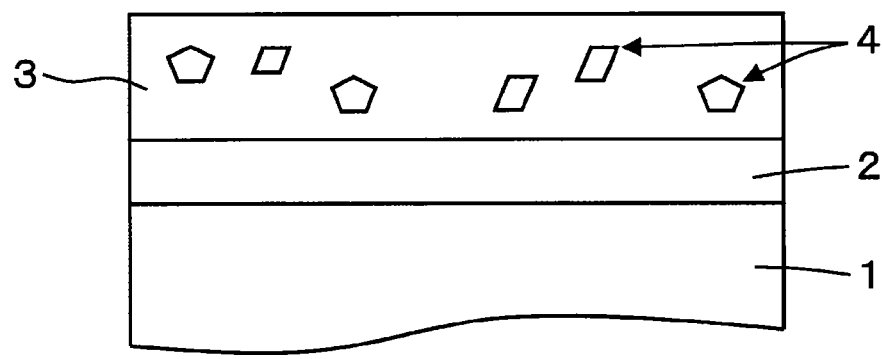
FIG. 1 This is a cross-sectional view, schematically showing a structure of a sliding member having a DLC film according to an embodiment of a sliding mechanism of the present invention.

The present invention relates to a lubricating oil composition, and a sliding mechanism using the lubricating oil composition. These are described in detail hereinunder.
1. Lubricating Oil Composition
[Lubricant Base Oil]

The lubricating oil composition of the present invention generally contains a lubricant base oil and a specific additive, and is used as a lubricating oil for use for sliding surfaces of low-friction sliding materials.

The lubricant base oil used in the present invention is not specifically limited, and may be suitably selected from publicly known mineral base oils (hereinafter this may be referred to as "mineral oils") and synthetic base oils (hereinafter this may be referred to as "synthetic oils") which have so far been used.

Here, the mineral base oils include, for example, distillate oils obtained through atmospheric distillation of paraffin-base crude oils, intermediate-base crude oils or naphthene-base crude oils, or those obtained through reduced-pressure distillation of the residual oils in atmospheric distillation, as well as purified oils obtained through purification of those distillate oils and others according to an ordinary method, for example, solvent-purified oils, hydrocracked oils, hydrogenation-refined oils, dewaxed oils, clay-treated oils, and further wax-isomerized oils, etc.

On the other hand, the synthetic oils include, for example, poly-α-olefins that are oligomers of α-olefins having from 8 to 14 carbon atoms, polybutene, polyol esters, alkylbenzenes, etc.

In the present invention, the above mineral oils may be used singly or in combination of two or more thereof as the lubricant base oil. Also, the above synthetic oils may be used singly or in combination of two or more thereof. Further, one or more mineral oils may be used in combination with one or more synthetic oils.

Advantageously, the lubricant base oil has a kinematic viscosity at 100° C. of generally from 2 mm$^2$/s to 50 mm$^2$/s, preferably from 3 mm$^2$/s to 30 mm$^2$/s, more preferably from 3 mm$^2$/s to 15 mm$^2$/s. When the kinematic viscosity at 100° C. is 2 mm$^2$/s or more, an evaporation loss is small, and when 50 mm$^2$/s or less, a power loss by viscosity resistance is less liable to become large so that a favorable fuel consumption improving effect is obtainable.

Preferably, the lubricant base oil has a viscosity index of 60 or more, more preferably 70 or more, even more preferably 80 or more. When the viscosity index is 60 or more, then the viscosity change depending on the base oil temperature is small and therefore stable lubrication performance can be exhibited.

Further, the lubricant base oil preferably has a sulfur content of 1000 ppm by mass or less, more preferably 500 ppm by mass or less, even more preferably 100 ppm by mass or less. The sulfur content of 1000 ppm by mass or less is effective for improving oxidation stability.

Also preferably, the composition contains the lubricant base oil in an amount of 70% by mass or more, more preferably 80% by mass or more, based on the total amount of the composition.

[Lubricating Oil Additives]

In the lubricating oil composition of the present invention, an organic zinc dithiophosphate is used as the component (A) of the lubricating oil additive. As the organic zinc dithiophosphate, in general, a zinc dithiophosphate represented by the following general formula (I):

[Chem. 1]

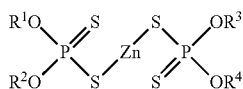

(I)

can be used.

In the general formula (I), $R^1$, $R^2$, $R^3$ and $R^4$ each independently represent a hydrocarbon group having from 1 to 24 carbon atoms. Such a hydrocarbon group is any of a straight-chained or branched alkyl group having from 1 to 24 carbon atoms, a straight-chained or branched alkenyl group having from 3 to 24 carbon atoms, a cycloalkyl group or a straight-chained or branched alkylcycloalkyl group having from 5 to 13 carbon atoms, an aryl group or a straight-chained or branched alkylaryl group having from 6 to 18 carbon atoms, or an arylalkyl group having from 7 to 19 carbon atoms.

The content of the zinc dithiophosphate of the component (A) must be, based on the total amount of the composition and in terms of the phosphorus concentration therein, from 0.005% by mass to 0.12% by mass. The content of less than 0.005% by mass could not provide a sufficient friction-reducing effect and abrasion-reducing effect; and when the content is more than 0.12% by mass, any remarkable result of improving the effect corresponding thereto could not be expected. From these, the content of the component (A) is preferably from 0.01 to 0.11% by mass, based on the total amount of the composition and in terms of the phosphorus concentration therein, more preferably from 0.02 to 0.10% by mass.

In the present invention, preferably, the zinc dithiophosphate contains a primary zinc dialkyldithiophosphate.

In the present invention, the zinc dithiophosphate of the component (A) preferably contains a primary zinc dialkyldithiophosphate in an amount of from 0.005% by mass to 0.05% by mass, based on the total amount of the composition and in terms of the phosphorus concentration therein, more preferably from 0.007% by mass to 0.05% by mass, even more preferably from 0.01% by mass to 0.05% by mass.

Existence of the zinc dithiophosphate that contains the specific amount of the primary zinc dialkyldithiophosphate as above as the component (A) in the lubricating oil can noticeably increase the friction-reducing effect on the sliding surface having a low-friction sliding material, in the presence of the amide-based friction-reducing agent of the component (B) to be mentioned below. Further, at the same time, even the abrasion resistance on the sliding surface not having a low-friction sliding material can also be further increased.

In the present invention, an amide-based friction-reducing agent is used as the component (B).

As the amide-based friction-reducing agent, in general, an amide-based compound to be obtained from an amine compound and a carboxylic acid compound is used.

As the amine compound to constitute the amide-based compound, there are exemplified aliphatic monoamines, aliphatic monoamine alkylene oxide adducts, aliphatic polyamines, alkanolamines, etc.

As the aliphatic monoamines, herein used are aliphatic monoamines having from 6 to 30 carbon atoms, preferably from 12 to 24 carbon atoms, more preferably from 16 to 22 carbon atoms. Those aliphatic monoamines may be straight-chained ones or branched ones, and may be saturated or unsaturated ones. Specific examples of such aliphatic monoamines include, for example, hexylamine, heptylamine, octylamine, 2-ethylhexylamine, nonylamine, decylamine, undecylamine, dodecylamine, tridecylamine, tetradecylamine, pentadecylamine, hexadecylamine, heptadecylamine, stearylamine, isostearylamine, nonadecylamine, eicosylamine, heneicosylamine, docosylamine, tricosylamine, tetracosylamine, 11-ethyltricosylamine, pentacosylamine, hexacosylamine, heptacosylamine, octacosylamine, nonacosylamine, triacontylamine, hexenylamine, heptenylamine, octenylamine, nonenylamine, decenylamine, undecenylamine, dodecenylamine, tridecenylamine, tetradecenylamine, pentadecenylamine, hexadecenylamine, heptadecenylamine, octadecenylamine, nonadecenylamine, eicosenylamine, heneicosenylamine, docosenylamine, tricosenylamine, tetracosenylamine, pentacosenylamine, hexacosenylamine, heptacosenylamine, octacosenylamine, nonacosenylamine, triacontenylamine, etc.

The aliphatic monoamine alkylene oxide adducts are preferably addicts of the above-mentioned aliphatic monoamines with alkylene oxide(s) having 2 or 3 carbon atoms. Specific examples of such aliphatic monoamine alkylene oxide adducts include aliphatic monoethanolamines such as hexylmonoethanolamine, heptylmonoethanolamine, octylmonoethanolamine, 2-ethylhexylmonoethanolamine, nonylmonoethanolamine, decylmonoethanolamine, undecylmonoethanolamine, dodecylmonoethanolamine, tridecylmonoethanolamine, tetradecylmonoethanolamine, pentadecylmonoethanolamine, hexadecylmonoethanolamine, heptadecylmonoethanolamine, octadecylmonoethanolamine, 2-heptylundecylmonoethanolamine, nonadecylmonoethanolamine, eicosylmonoethanolamine, heneicosylmonoethanolamine, docosylmonoethanolamine, tricosylmonoethanolamine, tetracosylmonoethanolamine, 11-ethyltricosylmonoethanolamine, pentacosylmonoethanolamine, hexacosylmonoethanolamine, heptacosylmonoethanolamine, octacosylmonoethanolamine, nonacosylmonoethanolamine, triacontylmonoethanolamine, hexenylmonoethanolamine, heptenylmonoethanolamine, octenylmonoethanolamine, nonenylmonoethanolamine, decenylmonoethanolamine, undecenylmonoethanolamine, dodecenylmonoethanolamine, tridecenylmonoethanolamine, tetradecenylmonoethanolamine, pentadecenylmonoethanolamine, hexadecenylmonoethanolamine, heptadecenylmonoethanolamine, octadecenylmonoethanolamine, nonadecenylmonoethanolamine, eicosenylmonoethanolamine, heneicosenylmonoethanolamine, docosenylmonoethanolamine, tricosenylmonoethanolamine, tetracosenylmonoethanolamine, pentacosenylmonoethanolamine, hexacosenylmonoethanolamine, heptacosenylmonoethanolamine, octacosenylmonoethanolamine, nonacosenylmonoethanolamine, triacontenylmonoethanolamine, etc.;

aliphatic diethanolamines such as hexyldiethanolamine, heptyldiethanolamine, octyldiethanolamine, 2-ethylhexyldiethanolamine, nonyldiethanolamine, decyldiethanolamine, undecyldiethanolamine, dodecyldiethanolamine, tridecyldiethanolamine, tetradecyldiethanolamine, pentadecyldiethanolamine, hexadecyldiethanolamine, heptadecyldiethanolamine, octadecyldiethanolamine, 2-heptylundecyldiethanolamine, nonadecyldiethanolamine, eicosyldiethanolamine, heneicosyldiethanolamine, docosyldiethanolamine, tricosyldiethanolamine, tetracosyldiethanolamine, 11-ethyltricosyldiethanolamine, pentacosyldiethanolamine, hexacosyldiethanolamine, heptacosyldiethanolamine, octacosyldiethanolamine, nonacosyldiethanolamine, triacontyldiethanolamine, hexenyldiethanolamine, heptenyldiethanolamine, octenyldiethanolamine, nonenyldiethanolamine, decenyldiethanolamine, undecenyldiethanolamine, dodecenyldiethanolamine, tridecenyldiethanolamine, tetradecenyldiethanolamine, pentadecenyldiethanolamine, hexadecenyldiethanolamine, heptadecenyldiethanolamine, octadecenyldiethanolamine such as cis-9-octadecenyldiethanolamine, nonadecenyldiethanolamine, eicosenyldiethanolamine, heneicosenyldiethanolamine, docosenyldiethanolamine such as cis-13-docosenyldiethanolamine, tricosenyldiethanolamine, tetracosenyldiethanolamine, pentacosenyldiethanolamine, hexacosenyldiethanolamine, heptacosenyldiethanolamine, octacosenyldiethanolamine, nonacosenyldiethanolamine, triacontenyldiethanolamine, etc.;

aliphatic monopropanolamines such as hexylmonopropanolamine, heptylmonopropanolamine, octylmonopropanolamine, 2-ethylhexylmonopropanolamine, nonylmonopropanolamine, decylmonopropanolamine, undecylmonopropanolamine, dodecylmonopropanolamine, tridecylmonopropanolamine, tetradecylmonopropanolamine, pentadecylmonopropanolamine, hexadecylmonopropanolamine, heptadecylmonopropanolamine, octadecylmonopropanolamine, 2-heptylundecylmonopropanolamine, nonadecylmonopropanolamine, eicosylmonopropanolamine, heneicosylmonopropanolamine, docosylmonopropanolamine, tricosylmonopropanolamine, tetracosylmonopropanolamine, 11-ethyltricosylmonopropanolamine, pentacosylmonopropanolamine, hexacosylmonopropanolamine, heptacosylmonopropanolamine, octacosylmonopropanolamine, nonacosylmonopropanolamine, triacontylmonopropanolamine, hexenylmonopropanolamine, heptenylmonopropanolamine, octenylmonopropanolamine, nonenylmonopropanolamine, decenylmonopropanolamine, undecenylmonopropanolamine, dodecenylmonopropanolamine, tridecenylmonopropanolamine, tetradecenylmonopropanolamine, pentadecenylmonopropanolamine, hexadecenylmonopropanolamine, heptadecenylmonopropanolamine, octadecenylmonopropanolamine, nonadecenylmonopropanolamine, eicosenylmonopropanolamine, heneicosenylmonopropanolamine, docosenylmonopropanolamine, tricosenylmonopropanolamine, tetracosenylmonopropanolamine, pentacosenylmonopropanolamine, hexacosenylmonopropanolamine, heptacosenylmonopropanolamine, octacosenylmonopropanolamine, nonacosenylmonopropanolamine, triacontenylmonopropanolamine, etc.;

aliphatic dipropanolamines such as hexyldipropanolamine, heptyldipropanolamine, octyldipropanolamine, 2-ethylhexyldipropanolamine, nonyldipropanolamine, decyldipropanolamine, undecyldipropanolamine, dodecyldipropanolamine, tridecyldipropanolamine, tetradecyldipropanolamine, pentadecyldipropanolamine, hexadecyldipropanolamine, heptadecyldipropanolamine, octadecyldipropanolamine, 2-heptylundecyldipropanolamine, nonadecyldipropanolamine, eicosyldipropanolamine, heneicosyldipropanolamine, docosyldipropanolamine, tricosyldipropanolamine, tetracosyldipropanolamine, 11-ethyltricosyldipropanolamine, pentacosyldipropanolamine, hexacosyldipropanolamine, heptacosyldipropanolamine, octacosyldipropanolamine, nonacosyldipropanolamine, triacontyldipropanolamine, hexenyldipropanolamine, heptenyldipropanolamine, octenyldipropanolamine, nonenyldipropanolamine, decenyldipropanolamine, undecenyldipropanolamine, dodecenyldipropanolamine, tridecenyldipropanolamine, tetradecenyldipropanolamine, pentadecenyldipropanolamine, hexadecenyldipropanolamine, heptadecenyldipropanolamine, octadecenyldipropanolamine, nonadecenyldipropanolamine, eicosenyldipropanolamine, heneicosenyldipropanolamine, docosenyldipropanolamine, tricosenyldipropanolamine, tetracosenyldipropanolamine, pentacosenyldipropanolamine, hexacosenyldipropanolamine, heptacosenyldipropanolamine, octacosenyldipropanolamine, nonacosenyldipropanolamine, triacontenyldipropanolamine, etc.

The alkanolamines are preferably 2-hydroxy-aliphatic monoamines (in which the aliphatic monoamine is an aliphatic monoamine having from 6 to 30 carbon atoms, preferably from 12 to 24 carbon atoms, more preferably from 16 to 22 carbon atoms). Specific examples of such alkanolamines include 2-hydroxyhexylamine, 2-hydroxyheptylamine, 2-hydroxyoctylamine, 2-hydroxynonylamine, 2-hydroxydecylamine, 2-hydroxyundecylamine, 2-hydroxydodecylamine, 2-hydroxytridecylamine, 2-hydroxytetradecylamine, 2-hydroxypentadecylamine, 2-hydroxyhexadecylamine, 2-hydroxyheptadecylamine, 2-hydroxyoctadecylamine, 2-hydroxyheptylundecylamine, 2-hydroxynonadecylamine, 2-hydroxyeicosylamine, 2-hydroxyheneicosylamine, 2-hydroxydocosylamine, 2-hydroxytricosylamine, 2-tetracosylamine, 11-ethyl-2-hydroxytricosylamine, 2-hydroxypentacosylamine, 2-hydroxyhexacosylamine, 2-hydroxyheptacosylamine, 2-hydroxyoctacosylamine, 2-hydroxynonacosylamine, 2-hydroxytriacontylamine, 2-hydroxyhexenylamine, 2-hydroxyheptenylamine, 2-hydroxyoctenylamine, 2-hydroxynonenylamine, 2-hydroxydecenylamine, 2-hydroxyundecenylamine, 2-hydroxydodecenylamine, 2-hydroxytridecenylamine, 2-hydroxytetradecenylamine, 2-hydroxypentadecenylamine, 2-hydroxyhexadecenylamine, 2-hydroxyheptadecenylamine, 2-hydroxyoctadecenylamine, 2-hydroxynonadecenylamine, 2-hydroxyeicosenylamine, 2-hydroxyheneicosenylamine, 2-hydroxydocosenylamine, 2-hydroxytricosenylamine, 2-hydroxytetracosenylamine, 2-hydroxypentacosenylamine, 2-hydroxyhexacosenylamine, 2-hydroxyheptacosenylamine, 2-hydroxyoctacosenylamine, 2-hydroxynonacosenylamine, 2-hydroxytriacontenylamine, etc.

The aliphatic polyamines include aliphatic polyamines having from 6 to 30 carbon atoms in total, preferably from 12 to 24 carbon atoms, more preferably from 16 to 20 carbon atoms. Specific examples of such aliphatic polyamines include hexamethylenediamine, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 1,21-diaminoheneicosane, 1,22-diaminodocosane, 1,23-diaminotricosane, 1,24-diaminotetracosane, 1,25-diaminopentacosane, 1,26-diaminohexacosane, 1,27-diaminoheptacosane, 1,28-diaminooctacosane, 1,29-diaminononacosane, 1,30-diaminotriacontane, hexenyldiamine, heptenyldiamine, octenyldiamine, nonenyldiamine, decenyldiamine, undecenyldiamine, dodecenyldiamine, tridecenyldiamine, tetradecenyldiamine, pentadecenyldiamine, hexadecenyldiamine, heptadecenyldiamine, octadecenyldiamine, nonadecenyldiamine, eicosenyldiamine, heneicosenyldiamine, docosenyldiamine, tricosenyldiamine, tetracosenyldiamine, pentacosenyldiamine, hexacosenyldiamine, heptacosenyldiamine, octacosenyldiamine, nonacosenyldiamine, triacontenyldiamine, triethylenetetramine, tetraethylenepentamine, pentaethylenehexamine, di(methylethylene)triamine, dibutylenetriamine, tributylenetetramine, pentapentylenehexamine, tris(2-aminoethyl)amine, etc.

On the other hand, as the carboxylic acid compound to constitute the amide compound, preferably used here is a monoaliphatic acids in which the hydrocarbon group has from 6 to 30 carbon atoms, preferably from 8 to 24 carbon atoms, more preferably from 12 to 24 carbon atoms, especially preferably from 18 to 22 carbon atoms. The aliphatic acids may be straight-chained ones or branched ones, and may be any of saturated or unsaturated ones.

Such carboxylic acid compounds include, for example, saturated fatty acids such as caproic acid, enanthic acid, caprylic acid, 2-ethylhexanoic acid, pelargonic acid, capric acid, lauric acid, myristic acid, palmitic acid, margaric acid, stearic acid, isostearic acid, arachidic acid, behenic acid, lignoceric acid, etc.; and unsaturated fatty acids such as lauric acid, myristoleic acid, palmitoleic acid, oleic acid, linoleic acid, erucic acid, etc.

Representative examples of the amide compound of the component (B) that is constituted of the above-mentioned amine compound and carboxylic acid compound include, for example, aliphatic acid amides having from 6 to 30 carbon atoms such as caproic acid amide, enanthic acid amide, 2-ethylhexanoic acid amide, 2-ethylhexanoic acid amide, pelargonic acid amide, 2-ethylhexanoic acid amide, lauric acid amide, myristic acid amide, palmitic acid amide, margaric acid amide, stearic acid amide, isostearic acid amide, arachidic acid amide, behenic acid amide, lignoceric acid amide, lauric acid amide, myristoleic acid amide, palmitoleic acid amide, oleic acid amide, linolenic acid amide, erucic acid amide, etc.; fatty acid monoethanolamides having from 6 to 22 carbon atoms such as caproic acid monoethanolamide, enanthic acid monoethanolamide, pelargonic acid monoethanolamide, capric acid monoethanolamide, 2-ethylhexanoic acid monoethanolamide, lauric acid monoethanolamide, myristic acid monoethanolamide, palmitic acid monoethanolamide, margaric acid monoethanolamide, stearic acid diethanolamide, isostearic acid monoethanolamide, arachidic acid monoethanolamide, behenic acid monoethanolamide, lignoceric acid monoethanolamide, lauric acid monoethanolamide, myristoleic acid monoethanolamide, palmitoleic acid monoethanolamide, oleic acid monoethanolamide, linolenic acid monoethanolamide, erucic acid monoethanolamide, etc.; fatty acid monopropanolamides such as caproic acid monopropanolamide, enanthic acid monopropanolamide, pelargonic acid monopropanolamide, capric acid monopropanolamide, 2-ethylhexanoic acid monopropanolamide, lauric acid monopropanolamide, myristic acid monopropanolamide, palmitic acid monopropanolamide, margaric acid monopropanolamide, stearic acid dipropanolamide, isostearic acid monopropanolamide, arachidic acid monopropanolamide, behenic acid monopropanolamide, lignoceric acid monopropanolamide, lauric acid monopropanolamide, myristoleic acid monopropanolamide, palmitoleic acid monopropanolamide, oleic acid monopropanolamide, linolenic acid monopropanolamide, erucic acid monopropanolamide, etc.; fatty acid diethanolamides having from 6 to 22 carbon atoms, such as caproic acid diethanolamide, enanthic acid diethanolamide, pelargonic acid diethanolamide, capric acid diethanolamide, 2-ethylhexanoic acid diethanolamide, lauric acid diethanolamide, myristic acid diethanolamide, palmitic acid diethanolamide, margaric acid diethanolamide, stearic acid diethanolamide, isostearic acid diethanolamide, arachidic acid diethanolamide, behenic acid diethanolamide, lignoceric acid diethanolamide, lauric acid diethanolamide, myristoleic acid diethanolamide, palmitoleic acid diethanolamide, oleic acid diethanolamide, linolenic acid diethanolamide, erucic acid diethanolamide, etc.; fatty acid dipropanolamides having from 6 to 22 carbon atoms, such as caproic acid dipropanolamide, enanthic acid dipropanolamide, pelargonic acid dipropanolamide, capric acid dipropanolamide, 2-ethylhexanoic acid dipropanolamide, lauric acid dipropanolamide, myristic acid dipropanolamide, palmitic acid dipropanolamide, margaric acid dipropanolamide, stearic acid dipropanolamide, isostearic acid dipropanolamide, arachidic acid dipropanolamide, behenic acid dipropanolamide, lignoceric acid dipropanolamide, lauric acid dipropanolamide, myristoleic acid dipropanolamide, palmitoleic acid dipropanolamide, oleic acid dipropanolamide, linolenic acid dipropanolamide, erucic acid dipropanolamide, etc.

Of the above-mentioned amide-based friction-reducing agents, preferred are alkanolamides having a saturated or unsaturated, straight-chained or branched aliphatic hydrocarbon group with from 12 to 24 carbon atoms, more preferably from 16 to 20 carbon atoms, from the viewpoint of the friction-reducing effect thereof. Especially preferred is diethanolamide.

One alone or two or more different types of those amide-based friction-reducing agents may be used as the component (B), either singly or as combined.

In the present invention, the content of the component (B) is from 0.05% by mass to 5% by mass based on the total amount of the composition, more preferably from 0.1% by mass to 3% by mass. The content of the component (B) of less than 0.05% by mass could not provide a sufficient friction-reducing effect; on the other hand, when the content is more than 5% by mass, any remarkable result of improving the effect corresponding to the increase in the content could not be expected.

In the present invention, the composition contains, as the component (C), an alkaline earth metal salicylate-based detergent and/or an alkaline earth metal sulfonate-based detergent.

The alkaline earth metal salicylate is an alkaline earth metal salt of an alkyl (generally alkyl group with from 4 to 30 carbon atoms) salicylic acid, in which the alkaline earth metal salt is preferably a calcium salt, a magnesium salt and a barium salt, especially preferably a calcium salt.

The alkaline earth metal sulfonate is preferably an alkaline earth metal salt of an alkyl-aromatic sulfonic acid that is obtained through sulfonation of an alkyl-aromatic compound having a molecular weight of from 300 to 1,500, preferably from 400 to 700.

The metallic detergent may be any of neutral salts, basic salts and overbased salts, and in general, herein usable are one or more selected from metallic detergents having a total base number of from 10 mg KOH/g to 500 mg KOH/g, preferably from 15 mg KOH/g to 450 mg KOH/g, more preferably from 15 mg KOH/g to 400 mg KOH/g, either singly or as combined.

The term "total base number" as used herein means the value as measured by a potentiometric titration method (base number/perchlorate method) according to the Item 7 of JIS K 2501 "Petroleum Products and Lubricants-Neutralization Number Testing Method."

The metallic detergent is, in general, commercially sold and available in a state diluted with a light lubricant base oil or the like. In general, it is desirable that a commercial product having a metal content of from 1.0% by mass to 20% by mass, preferably from 2.0% by mass to 16% by mass, be used.

The content of the metallic detergent of the component (C) is from 0.05% by mass to 0.5% by mass, based on the total amount of the lubricating oil composition and in terms of the alkaline earth metal concentration therein, preferably from 0.1% by mass to 0.3% by mass, more preferably from 0.15% by mass to less than 0.25% by mass.

The content of the component (C) of less than 0.05% by mass would provide insufficient detergency, but the content of more than 0.5% by mass may provide, as the case may be, an insufficient effect of reducing the friction coefficient.

The lubricating oil composition of the present invention may contain, as incorporated therein without detracting from the advantageous effects of the present invention, any other known conventional additive than the components (A), (B) and (C), and for example, there are mentioned a metallic detergent, an ashless dispersant, a friction-reducing agent, a viscosity index improver, a pour-point depressant, an antioxidant, a rust inhibitor, etc.

The metallic detergent includes alkaline earth metal phenates.

The ashless dispersant includes, for example, succinic acid imides, boron-containing succinic acid imides, benzylamines, boron-containing benzylamines, succinates, amides of mono- or di-carboxylic acids such as typically fatty acids or succinic acid, etc.

The friction-reducing agent includes ashless friction-reducing agents such as fatty acid ester-based, aliphatic amine-based, higher alcohol-based ones or the like.

As the viscosity index improver, concretely, there are exemplified so-called non-dispersive viscosity index improvers such as various methacrylates as well as copolymers thereof in any desired combination and their hydrides, etc.; and so-called dispersive viscosity index improvers prepared by further copolymerization with various nitrogen compound-containing methacrylates, etc. Further exemplified are non-dispersive or dispersive ethylene-α-olefin copolymers (in which α-olefin is, for example, propylene, 1-butene, 1-pentene, etc.) and hydrides thereof, polyisobutylene and hydrides thereof, styrene-diene copolymer hydrides, styrene-maleic anhydride ester copolymers, as well as polyalkylstyrenes, etc. The molecular weight of those viscosity index improvers must be defined in consideration of shear stability. Concretely, the number-average molecular weight of the viscosity index improver of, for example, dispersive or non-dispersive polymethacrylate is from 5000 to 1000000, preferably from 100000 to 800000; that of polyisobutylene or its hydride is from 800 to 5000; that of ethylene-α-olefin copolymer or its hydride is from 800 to 300000, preferably from 10000 to 200000. One alone or plural types of those viscosity index improvers may be incorporated either singly or as combined, but in general, the content of the improver is from 0.1% by mass to 40.0% by mass or so based on the total amount of the lubricating oil composition.

The pour-point depressant includes, for example, polymethacrylates, etc.

The antioxidant includes phenolic antioxidants and amine-based antioxidants. The phenolic antioxidants include, for example, 4,4'-methylenebis(2,6-di-t-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butylphenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethylphenol; 2,4-dimethyl-6-t-butylphenol; 2,6-di-t-amyl-p-cresol; 2,6-di-t-butyl-4-(N,N'-dimethylaminomethylphenol; 4,4'-thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octadecyl-3-(4-hydroxy-3,5-di-t-butylphenyl) propionate; 2,2'-thio[diethyl-bis-3-(3,5-di-t-butyl-4-hydroxyphenyl) propionate] and the like. Among them, bisphenolic and ester group-containing phenolic antioxidants are particularly preferred.

The amine-based antioxidants include, for example, monoalkyldiphenylamines such as monooctyldiphenylamine, monononyldiphenylamine and the like; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-diocyldiphenylamine, 4,4'-dinonyldiphenylamine and the like; polyalkyldiphenylamines such as tetrabutyldiphenylamine, tetrahexyldiphenylamine, tetraoctyldiphenylamine, tetranonyldiphenylamine and the like; naphthylamines, to be specific, α-naphthylamine, phenyl-α-naphthylamine and alkyl-substituted phenyl-α-naphthylamines such as butylphenyl-α-naphthylamine, pentylphenyl-α-naphthylamine, hexylphenyl-α-naphthylamine, heptylphenyl-α-naphthylamine, octylphenyl-α-naphthylamine, nonylphenyl-α-naphthylamine and the like. Among them, dialkyldiphenylamines-based and naphthylamine-based antioxidants are preferred.

As the rust inhibitor, there may be mentioned alkylbenzene sulfonates, dinonylnaphthalene sulfonates, alkenylsuccinates, polyalcohol esters, etc.

The lubricating oil composition of the present invention may be applied to a sliding face having a low-friction sliding material and can impart excellent low-friction property and excellent abrasion resistance thereto. Especially when applied to internal combustion engines, the lubricating oil composition can achieve a fuel consumption-saving effect.

The sliding face having a low-friction sliding material described above is preferably a sliding face which has a DLC material as the low-friction sliding material and which constitutes at least one of the sliding faces. In this case, a material of the other sliding face may be, for example, a DLC material, an iron base material and an aluminum alloy material. That is, examples of the combination of two sliding faces are a constitution in which both of the two sliding faces are the DLC materials, a constitution in which one sliding face is the DLC material and the other sliding face is the iron base material, and a constitution in which one sliding face is the DLC material and the other sliding face is the aluminum alloy material.

Here, the above-mentioned DLC material has a DLC film on the surface thereof. DLC that constitutes the film is made of an amorphous material constituted mainly of carbon elements, in which the bonding form of carbons includes a diamond structure ($SP^3$ bond) and a graphite bond ($SP^2$ bond).

To be specific, DLC may include a-C (amorphous carbon) composed only of carbon elements, a-C:H (hydrogenated amorphous carbon) containing hydrogen and MeDLC (metal doped DLC) partially containing metal elements such as silicon (Si), titanium (Ti), molybdenum (Mo) and the like.

Among them, a-C:H (hydrogenated amorphous carbon), specifically a-C:H containing from 5 atom % to 50 atom % of hydrogen is preferred.

Further, DLC is preferably DLC showing a graphite crystal peak in the X-ray scattering spectrum thereof.

DLC having such a graphite crystal peak may be formed by a cathode PIG (Penning Ionization Gauge) plasma CVD method in a high density plasma atmosphere.

As the iron base material, on the other hand, there may be mentioned, for example, carburized steel SCM420 and SCr420 (JIS). As the aluminum alloy material, it is preferable to use a hypoeutectic aluminum alloy or a hypereutectic aluminum alloy containing from 4% by mass to 20% by mass of silicon and from 1.0% by mass to 5.0% by mass of copper. To be more specific, there may be mentioned, for example, AC2A, AC8A, ADC12, ADC14 (JIS).

It is also preferred that the DLC material and the iron base material, or the DLC material and the aluminum alloy material each have a surface roughness of 0.1 μM or less in terms of an arithmetic average roughness Ra from the viewpoint of stable sliding. When the roughness is 0.1 μm or less, local scuffing is less liable to be formed, and an increase of friction coefficient can be inhibited. It is further preferred that the DLC material described above has a surface hardness Hv of from 1,000 to 3,500 in terms of micro-Vickers hardness (98 mN load) and a thickness of from 0.3 μm to 2.0 μm.

On the other hand, the iron base material described above has preferably a surface hardness HRC of from 45 to 60 in terms of Rockwell hardness (C scale). This is effective because, the durability of the film can be maintained even exposed to a sliding condition, which is under a high face pressure of about 700 MPa, as is the case with a cam follower.

Also, the aluminum alloy material described above preferably has a surface hardness HB of from 80 to 130 in terms of Brinell hardness.

When the surface hardness and thickness of the DLC material fall within the ranges described above, abrasion and peeling may be inhibited. Further, when the surface hardness of the iron base material is HRC 45 or more, it is possible to inhibit buckling and peeling under a high face pressure. On the other hand, when the surface hardness of the aluminum alloy material falls within the range described above, the aluminum alloy material is inhibited from being abraded.

The sliding part to which the lubricating oil composition of the present invention is applied shall not specifically be restricted as long as it has a surface in which two metal surfaces are brought into contact with each other and in which at least one of them has a low-friction sliding material. A sliding part of an internal combustion engine may be mentioned as a preferred example thereof. In this case, more excellent low-friction property as compared with conventional technique is obtained. And this is effective because the fuel consumption saving effect is also exerted. As the DLC member, for example, there are mentioned disc like shims and lifter crestal planes each having a coating of DLC on a base plate of a steel material. Examples of the iron base material include cam lobes formed of low alloy chilled cast iron, carburized steel or thermally refined carbon steel, or any combination thereof.

2. Sliding Mechanism

The sliding mechanism of the present invention is a sliding mechanism having, as sandwiched between the sliding surfaces of two sliding materials that slide to each other, the above-mentioned lubricating oil composition, in which a DLC film containing hydrogen in an amount of from 5 atom % to 50 atom % is formed on at least one sliding surface of the two sliding materials.

More preferably, the DLC film is a DLC film having graphite crystal peaks in the X-ray scattering spectrum thereof.

A case in which the DLC film described above is a DLC film having graphite crystal peaks in its X-ray scattering spectrum will be explained below with reference to the drawings.

Figure 2:
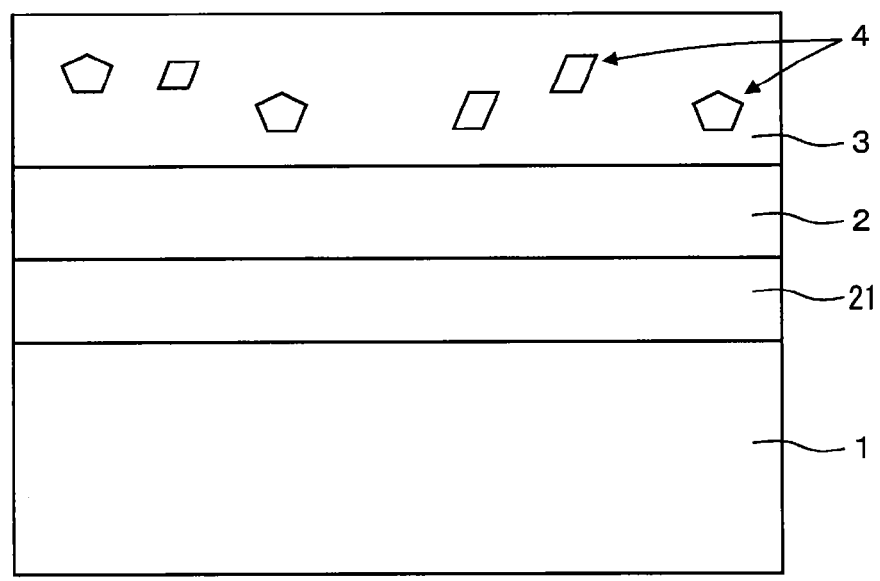
FIG. 2 This is a cross-sectional view, schematically showing a structure of a sliding member having a DLC film according to another embodiment of a sliding mechanism of the present invention.

FIG. 1 is a cross-sectional view schematically showing a structure of a sliding member having a DLC film according to one embodiment a sliding mechanism of the present invention, and FIG. 2 is a cross-sectional view schematically showing a structure of the a sliding member having a DLC film according to another embodiment of a sliding mechanism of the present invention.

Referring to FIG. 1 and FIG. 2, designated as 1 is a substrate of a sliding material, 3 is a DLC film and 4 is a graphite crystal. An intermediate layer 2 is provided as an adhesive layer between the substrate 1 of a sliding material and the DLC film 3.

A primer layer 21 may be provided, as shown in FIG. 2, as a second intermediate layer between the substrate 1 and the intermediate layer 2. An adhesive property of the substrate 1 with the intermediate layer 2 can be further enhanced by providing the primer layer 21.

The above DLC film having a peak of a graphite crystal may be formed by a cathode PIG (Penning Ionization Gauge) plasma CVD method in a high density plasma atmosphere.

To be specific, a plasma generated, for example, in a cathode PIG is shut in a magnetic field formed by a coil, whereby the plasma is densified. Thus, a raw material gas is decomposed into active atoms, molecules and ions at a high efficiency. Further, a direct current pulse is applied onto the substrate while piling up the highly active raw material gas components, whereby high energy ions can be radiated. This makes it possible to efficiently form a DLC film which is excellent in a sliding characteristic. In respect to the details of the forming method, the method described in JP-A-2010-156026 is preferred.

Figure 3:
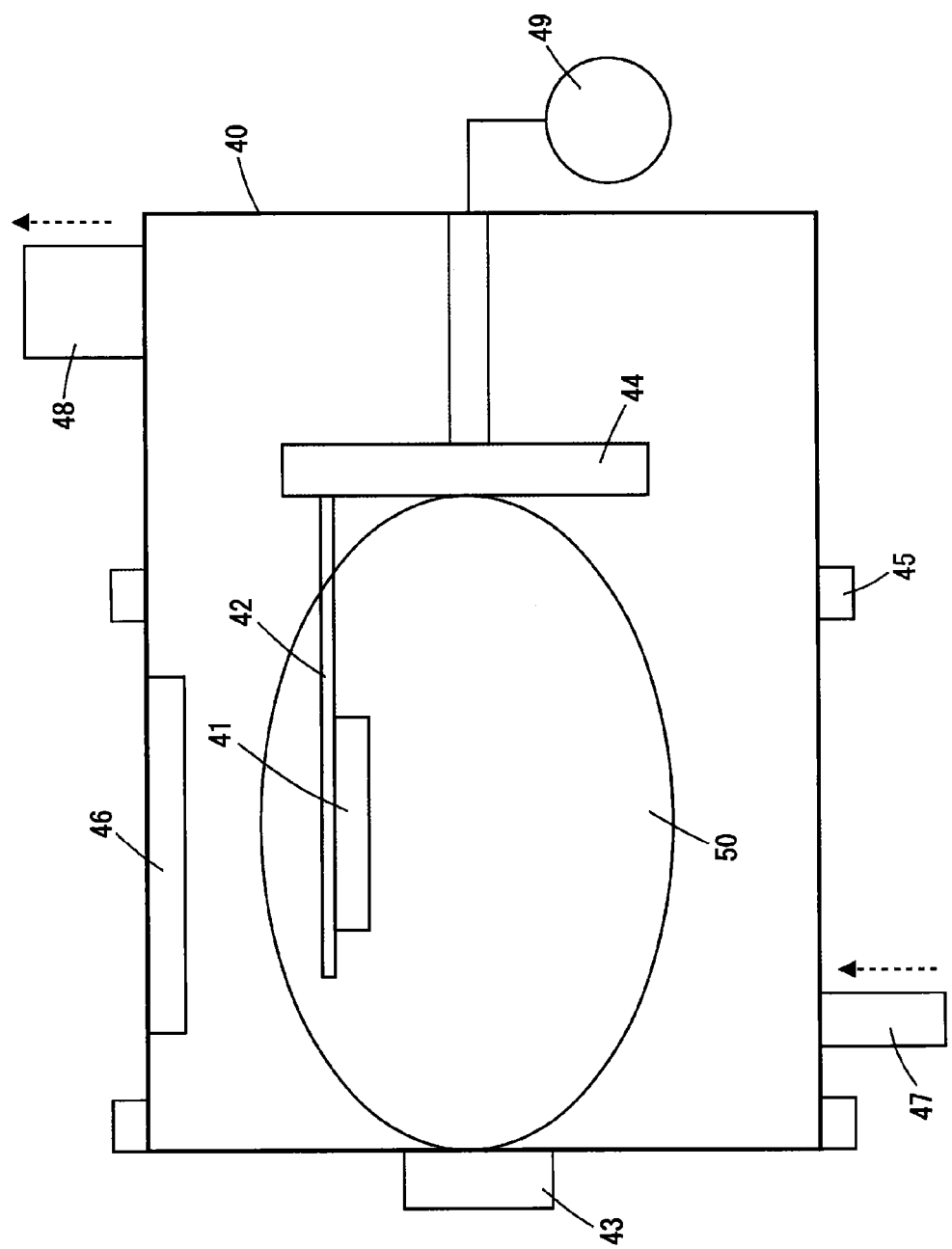
FIG. 3 This is a schematic view, showing an outline of a cathode PIG plasma CVD device which is an example of a DLC film forming apparatus according to one embodiment of the present invention.

FIG. 3 is a diagram showing an outline of one example of the cathode PIG plasma CVD device described above.

In FIG. 3, designated as 40 is a chamber; 41 is a substrate; 42 is a holder; 43 is a plasma source; 44 is an electrode; 45 is a coil; 46 is a cathode; 47 is a gas introducing port; 48 is a gas discharge port; 49 is a bias electric source. 50 is a plasma formed in the chamber 40.

The DLC film can be formed in the following manner by using the device described above.

First, the substrate 41 which is supported by the holder 42 is disposed in the chamber 40. Next, Ar gas is injected from the gas introducing port 47, and the plasma 50 is generated and stabilized by using the plasma source 43, the electrode 44 and the coil 45. The Ar gas decomposed in the plasma is attracted to the substrate 41 by the bias electric source 49 to carry out surface etching. Then, a metal layer which is a primer layer is formed by using the cathode 46 comprising metal and the Ar gas. Further, a raw material gas injected from the gas introducing port 47 is decomposed and reacted in a high density plasma atmosphere to thereby form graphite crystal in the DLC film. This is maintained as is until the DLC film having a prescribed thickness is obtained. In this case, a crystal diameter of the graphite crystal is controlled so that the diameter becomes from 15 nm to 100 nm.

In the cathode PIG plasma CVD device described above, the characteristics of the DLC film obtained may be changed by changing the plasma characteristics and the kind of gases, and the sliding property and the durability may be improved by optimizing an amount of the graphite crystal and a hardness, a surface roughness and the like of the DLC film in addition to a crystal diameter of the graphite crystal described above.

The presence of the graphite crystal in the DLC film formed and the crystal diameter are preferably confirmed by using X-ray diffraction measurement shown below.

Generally, a plural number of sharp diffraction peaks corresponding to the respective lattice planes are present in an X-ray diffraction spectrum of a crystal material, and a crystal structure thereof is usually determined by checking the above peaks. In contrast to this, in a case of the preferred DLC film of the present invention, the diffraction peaks of the graphite crystal are present among scattered broad peaks which are inherent to an amorphous material and called halo patterns.

Figure 4:
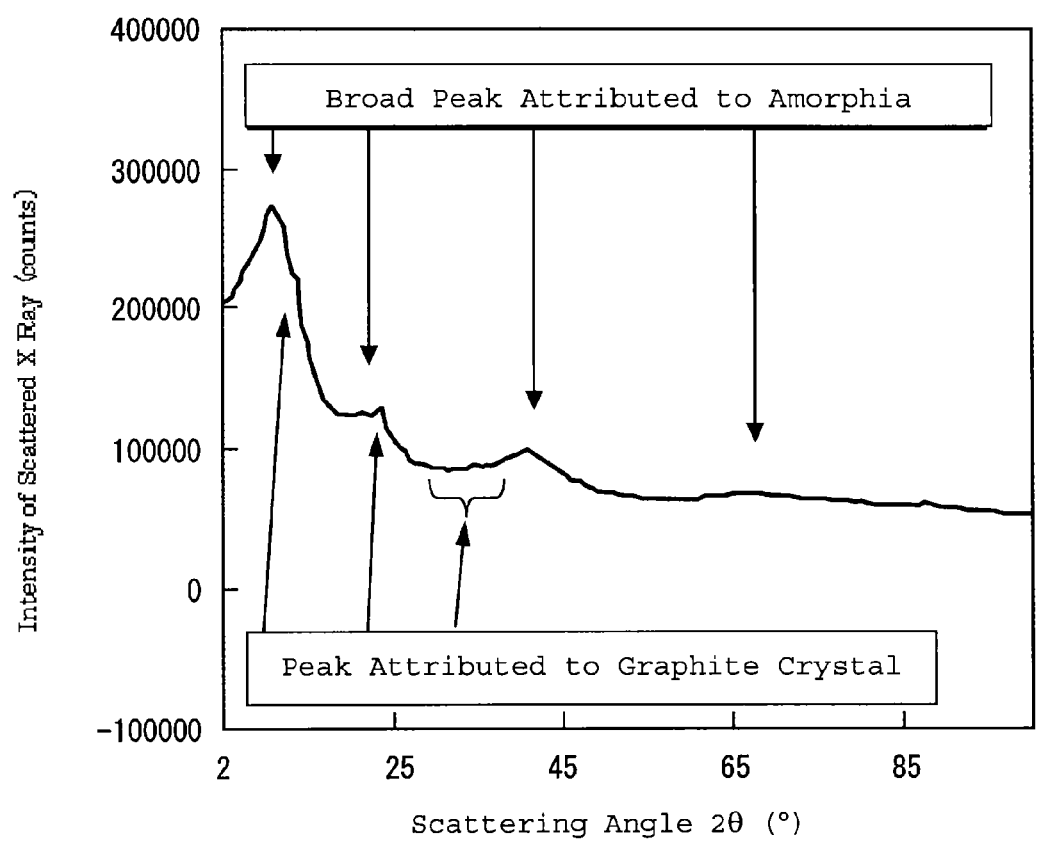
FIG. 4 This is a measurement example of the X-ray diffraction spectrum of a DLC film according to one embodiment of the present invention.

FIG. 4 shows an X-ray diffraction spectrum of the DLC film containing graphite crystals, as measured under the condition mentioned below.

Measurement Conditions
 X-ray source: radiant light source
 X-ray energy: 15 KeV
 Incident slit width: 0.1 mm
 Detector: scintillation counter (solar slit is placed in the front stage)
 Measuring range of scattering angle 2θ: 5 to 100°
 Measuring step: 0.1°
 Integration time: 30 seconds/step The DLC film sample was peeled off from the base plate, and it was filled into a narrow glass tube (capillary) and measured.

Figure 5:
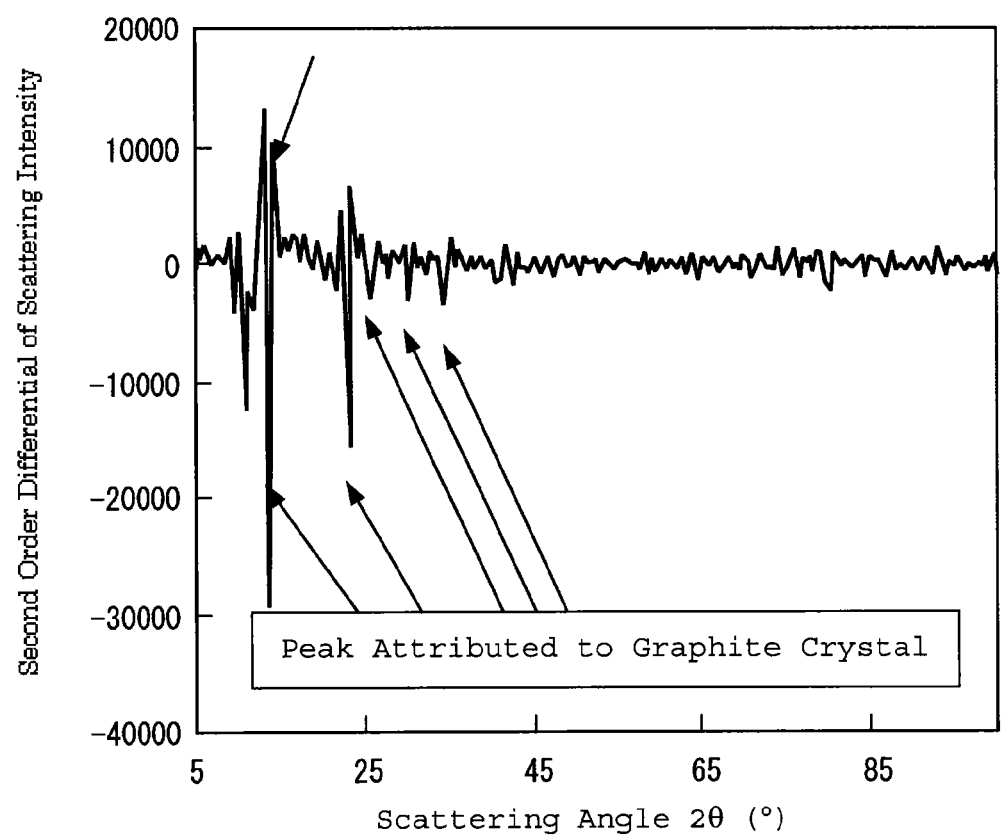
FIG. 5 This is a derivative spectrum of the DLC film of FIG. 4.

As shown in FIG. 4, since the main components of the preferred DLC film in the present invention are amorphous, the intensity of diffraction peaks of the graphite crystal is occasionally relatively weak. Even in the above case, the presence of the main crystal peaks can be confirmed by using a derivative spectrum which is widely used in analytical chemistry. A derivative spectrum of the same DLC film sample as used in FIG. 4 is shown in FIG. 5.

In the embodiment of the present invention, largest 10 peaks are selected among peaks that are present in the derivative spectrum. When there are at least 3 peaks which coincide with the peak positions of the graphite crystal, then the DLC film is judged to contain the graphite crystal. The above method is based on a Hanawalt method used in X-ray diffraction of ordinary crystal materials, that is, a method for characterizing diffraction patterns by using three most intense peaks in the pattern.

Figure 6:
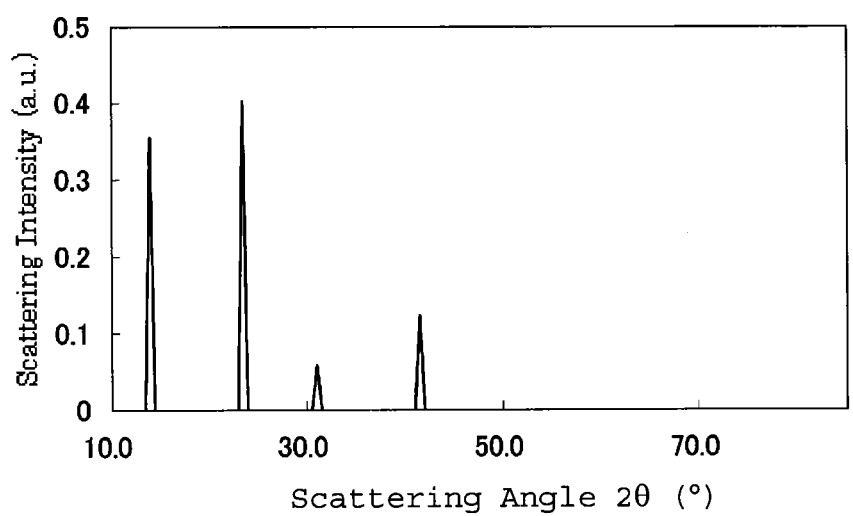
FIG. 6 This is a view showing the crystal peaks of the DLC film of FIG. 4.

Further, the crystal diameter of the graphite crystal may be estimated from broadening of the diffraction peaks shown above. To be more specific, the crystal diameter may be determined by deducting halo patterns attributed to amorphous components as a background from the X-ray scattering spectrum to extract graphite crystal peaks, followed by applying a Scherrer equation shown by Equation 1. The result obtained by extracting the graphite crystal peaks of the same DLC film sample as used in FIG. 4 is shown in FIG. 6.

$$D = (0.9 \times \lambda)/(\beta \times \cos \theta) \qquad \text{Equation 1}$$

D: crystal diameter (nm)
 λ: wavelength of X-ray (nm)
 β: half value width of crystal peak (radian)
 θ: position of crystal peak The DLC film obtained has, as described above, an amorphous structure comprising carbon as the main component. The bonding form of carbons comprises both of a diamond structure ($SP^3$ structure) and a graphite structure ($SP^2$ structure). The film contains from 10 atom % to 35 atom % of hydrogen.

In general, it is difficult to form the above DLC film on an iron base material, an aluminum alloy and the like with a good adhesive force. Therefore, the intermediate layer as an adhesive layer is provided as described above. More specifically, the intermediate layer preferably comprises any one or more layers of a metal layer, a metal nitride layer or a metal carbide layer containing any metal selected from, for example, Ti, Cr, W and Si. The total thickness of the intermediate layer is preferably from 0.1 μm to 3.5 μm. The thickness of 0.1 μm or more can secure the function of the intermediate layer. On the other hand, the thickness of 3.5 μm or less may prevent the impact resistance and the adhesiveness of the DLC film from being lowered owing to the low hardness of the intermediate layer. The primer layer includes, to be specific, a film of metal selected from, for example, Ti, Cr, W and Si.

The sliding mechanism according to the present invention is constituted from the above-described lubricating oil and the sliding member. Because both of the lubricating oil and the sliding member have an excellent low-friction property, as described above, a sufficiently low friction coefficient can be obtained.

In the sliding member, the DLC film described above is formed on at least one of two sliding faces which slidably move relative to each other. The sliding face of the opposite member is not specifically limited, i.e. a DLC film may be formed similarly thereon or may not be formed. As the material of the opposite member on which a DLC film is not formed, there may be mentioned an iron base material, an aluminum alloy material, etc. which are described above.

EXAMPLE

Next, the present invention will be described in further detail with reference to examples, but the present invention shall by no means be restricted to these examples.

Examples 1, 2 and Comparative Examples 1 to 3

The lubricating oil compositions comprising the components shown in Table 1 were prepared and subjected to a frictional property test shown below to determine the friction coefficient thereof. The results are shown in Table 1.
<Frictional Property Test>
 Test Apparatus: TE77 Reciprocating Friction Tester
 Test Pieces:
 Test Ball SUJ-2 ball (diameter 10 mm)

Test Plate DLC-coated plate (base material: SUJ-2, 58 mm×38 mm×4 mm)

Test Condition: load 100 N, temperature 100° C., amplitude 8 mm, frequency 10 Hz The DLC-coated disc used here is as follows.

DLC containing 20 atom % of hydrogen (graphite crystal size 20 nm)

The intermediate layer of the DLC coating is comprised of a Ti layer, and the total thickness thereof is 3.0 μm.

(11) Succinic Acid Monoimide Boride: number-average molecular weight of polybutenyl group 1000, base number (perchlorate method) 25 mg KOH/g, nitrogen content: 1.23% by mass, boron content: 1.3% by mass

(12) Viscosity Index Improver: polymethacrylate, mass-average molecular weight 230,000

(13) Other Additives: antioxidant, pour-point depressant, etc.

TABLE 1

|  |  | Example | | Comparative Example | | |
|---|---|---|---|---|---|---|
|  |  | 1 | 2 | 1 | 2 | 3 |
| Compounded Component (% by mass) | hydrorefined base oil | balance | balance | balance | balance | balance |
|  | friction-reducing agent A | 1.00 | — | — | — | — |
|  | friction-reducing agent B | — | 1.00 | — | — | — |
|  | friction-reducing agent C | — | — | — | 1.00 | — |
|  | friction-reducing agent D | — | — | — | — | 0.70 |
|  | zinc dithiophosphate A (P concentration-equivalent amount) | 0.21 (0.016) | 0.21 (0.016) | 0.21 (0.016) | 0.21 (0.016) | 0.21 (0.016) |
|  | zinc dithiophosphate B (P concentration-equivalent amount) | 0.86 (0.062) | 0.86 (0.062) | 0.86 (0.062) | 0.86 (0.062) | 0.86 (0.062) |
|  | metallic detergent A (Ca concentration-equivalent amount) | 2.30 (0.182) | 2.30 (0.182) | 2.30 (0.182) | 2.30 (0.182) | 2.30 (0.182) |
|  | metallic detergent B (Ca concentration-equivalent amount) | 0.75 (0.018) | 0.75 (0.018) | 0.75 (0.018) | 0.75 (0.018) | 0.75 (0.018) |
|  | succinic acid bisimide | 3.00 | 3.00 | 3.00 | 3.00 | 3.00 |
|  | succinic acid monoimide boride | 1.50 | 1.50 | 1.50 | 1.50 | 1.50 |
|  | viscosity index improver | 5.20 | 5.20 | 5.00 | 5.00 | 5.00 |
|  | other additives | 0.10 | 0.10 | 0.10 | 0.10 | 0.10 |
| Properties of Composition | P content (% by mass) | 0.077 | 0.077 | 0.077 | 0.077 | 0.077 |
|  | Ca content (% by mass) | 0.20 | 0.20 | 0.20 | 0.20 | 0.20 |
| Evaluation Results | Friction Coefficient (—) | 0.062 | 0.056 | 0.076 | 0.072 | 0.076 |

The components in Table 1 used in the preparation of the lubricating oil compositions are as follows.

(1) Hydrorefined base oil, kinematic viscosity at 40° C. 18 mm$^2$/s; kinematic viscosity at 100° C. 4.1 mm$^2$/s; viscosity index 131; % CA 0.0; sulfur content less than 10 ppm by mass (2) Friction-Reducing Agent A: cis-9-octadecenyldiethanolamide (3) Friction-Reducing Agent B: octadecyldiethanolamide (4) Friction-Reducing Agent C: monoglycerol oleate, diglycerol oleate mixed (5) Friction-Reducing Agent D: sulfurized oxymolybdenum dithiocarbamate: Trade name: "SAKURA-LUBE 515" (manufactured by ADEKA Corporation), molybdenum content: 10.0% by mass, nitrogen content: 1.6% by mass, sulfur content: 11.5% by mass (6) Zinc Dialkyldithiophosphate A: Zn content: 8.9% by mass, phosphorus content: 7.4% by mass, primary alkyl-type zinc dialkyldithiophosphate (7) Zinc Dialkyldithiophosphate B: Zn content: 8.0% by mass, phosphorus content: 7.2% by mass, secondary alkyl-type zinc dialkyldithiophosphate (8) Metallic Detergent A: overbased calcium salicylate, base number (perchlorate method): 226 mg KOH/g, calcium content: 7.9% by mass (9) Metallic Detergent B: neutral calcium sulfonate, base number (perchlorate method) 17 mg KOH/g, calcium content: 2.4% by mass

(10) Succinic acid bisimide: number-average molecular weight of polybutenyl group 2000, base number (perchlorate method) 11.9 mg KOH/g, nitrogen content: 0.99% by mass From the results in Table 1, the compositions of Examples 1 and 2, which are the lubricating oil compositions of the present invention, are excellent as having a low friction coefficient. On the other hand, the composition of Comparative Example 1 has a high friction coefficient as not containing a friction-reducing agent. Though containing a molybdenum-based friction-reducing agent or an ester-based friction-reducing agent, the compositions of Comparative Examples 2 and 3 have a high friction coefficient.

INDUSTRIAL APPLICABILITY

The lubricating oil composition of the present invention is applicable to a sliding face formed of a low-friction sliding material such as a DLC material and is capable of imparting excellent low-frictional property thereto. In particular, when applied to internal combustion engines, the lubricating oil composition can give a fuel consumption-saving effect. Further, the sliding mechanism of the present invention in which the lubricating oil composition is allowed to be present is excellent in low-friction property.

REFERENCE SIGNS LIST 1, 41 Substrate
2 Intermediate Layer
3 DLC Film
4 Graphite Crystal
21 Primer Layer
40 Chamber 42 Holder
43 Plasma Source
44 Electrode
45 Coil
46 Cathode
47 Gas Introducing Port
48 Gas Discharge Port
49 Bias Electric Source
50 Plasma

The invention claimed is:

1. A lubricating oil composition, comprising a lubricant base oil and:
   (A) an organic zinc dithiophosphate in an amount of from 0.005% by mass to 0.10% by mass in terms of phosphorus concentration;
   (B) a diethanolamide comprising an aliphatic hydrocarbon group having from 16 to 22 carbon atoms in an amount of from 1% by mass to 3% by mass;
   (C) a calcium salicylate-based detergent, a calcium sulfonate-based detergent, or both, in an amount of from 0.1% by mass to 0.25% by mass in terms of alkaline earth metal concentration; and
   (D) an ashless dispersant comprising a succinic acid imide, a boron-containing succinic acid imide, or a mixture thereof,
   based on a total mass of the lubricating oil composition, wherein:
   the organic zinc dithiophosphate (A) comprises a primary zinc dialkyldithiophosphate in an amount of from 0.005% by mass to 0.05% by mass in terms of phosphorus concentration therein, based on the total mass of the lubricating oil composition; and
   the lubricating oil composition exhibits a friction coefficient of less than or equal to 0.062 when subjected to a frictional property test in which a diamond-like carbon (DLC) coated disc containing 20 atom % of hydrogen is subject to a load of 100 N at a temperature of 100° C. in a reciprocating friction tester operated at an amplitude of 8 mm with a frequency of 10 Hz.

2. The lubricating oil composition according to claim 1, wherein the lubricating oil composition is adapted to function as a lubricating oil for a low-friction sliding material having a diamond-like carbon (DLC) film.

3. A sliding mechanism comprising, as sandwiched between sliding surfaces of two sliding members that slide to each other, the lubricating oil composition of claim 1, wherein a diamond-like carbon (DLC) film comprising hydrogen in an amount of from 5 atom % to 50 atom % is formed on at least one sliding surface of the two sliding members.

4. The sliding mechanism according to claim 3, wherein the diamond-like carbon (DLC) film is a film having graphite crystal peaks in an X-ray scattering spectrum thereof.

5. The sliding mechanism according to claim 4, wherein a crystal diameter of a graphite crystal in the diamond-like carbon (DLC) film is from 15 nm to 100 nm.

6. The sliding mechanism according to claim 3, wherein the diamond-like carbon (DLC) film is formed in a high-density plasma atmosphere according to a cathode PIG plasma CVD method.

7. The lubricating oil composition according to claim 1, wherein the lubricating oil composition exhibits a friction coefficient ranging from 0.056 to 0.062 when subjected to a frictional property test in which a diamond-like carbon (DLC) coated disc containing 20 atom % of hydrogen is subject to a load of 100 N at a temperature of 100° C. in a reciprocating friction tester operated at an amplitude of 8 mm with a frequency of 10 Hz.

\* \* \* \* \*